(12) United States Patent
Krause

(10) Patent No.: US 9,894,924 B2
(45) Date of Patent: Feb. 20, 2018

(54) PASTEURIZATION TUNNEL AND PASTEURIZATION METHOD FOR BEVERAGE PACKS

(71) Applicant: KRONES AG, Neutraubling (DE)

(72) Inventor: Hans-Joachim Krause, Westerholz (DE)

(73) Assignee: KRONES AG, Neutraubling (DE)

( * ) Notice: Subject to any disclaimer, the term of this patent is extended or adjusted under 35 U.S.C. 154(b) by 299 days.

(21) Appl. No.: 13/945,118

(22) Filed: Jul. 18, 2013

(65) Prior Publication Data

US 2014/0023763 A1 Jan. 23, 2014

(30) Foreign Application Priority Data

Jul. 23, 2012 (DE) ......................... 10 2012 212 873

(51) Int. Cl.
| | | |
|---|---|---|
| *A23C 3/02* | (2006.01) | |
| *A23L 3/00* | (2006.01) | |
| *A23L 3/02* | (2006.01) | |
| *A23L 3/04* | (2006.01) | |

(52) U.S. Cl.
CPC ................. *A23L 3/001* (2013.01); *A23L 3/02* (2013.01); *A23L 3/04* (2013.01)

(58) Field of Classification Search
CPC ............... A23L 3/04; A23L 3/001; A23L 3/02
USPC ................... 165/120; 134/68; 198/402, 525; 62/374, 64
See application file for complete search history.

(56) References Cited

U.S. PATENT DOCUMENTS

| | | | | |
|---|---|---|---|---|
| 3,732,917 | A | * | 5/1973 | Deubel ........................ 165/120 |
| 4,693,902 | A | * | 9/1987 | Richmond et al. ........... 426/407 |
| 4,841,457 | A | * | 6/1989 | Clyne et al. .................. 702/130 |
| 2007/0082100 | A1 | * | 4/2007 | Dhruv ....................... A23L 3/36 426/521 |
| 2009/0280222 | A1 | | 11/2009 | Nielsen et al. |

FOREIGN PATENT DOCUMENTS

| | | | | |
|---|---|---|---|---|
| DE | 1910136 U | * | 2/1965 | |
| DE | 1910136 U | | 2/1965 | |
| DE | 29716644 U1 | * | 11/1997 | ............... A61L 2/26 |
| DE | 29716644 U1 | | 11/1997 | |
| EP | 0169361 A2 | | 1/1986 | |
| WO | WO 9419968 A1 | * | 9/1994 | ............. A23L 3/003 |

OTHER PUBLICATIONS

Search Report for EP 13 17 3640, dated Aug. 5, 2014.
German search report for 10 2012 212 873.5, dated Apr. 25, 2013.

* cited by examiner

*Primary Examiner* — Dana Ross
*Assistant Examiner* — Brandon Harvey
(74) *Attorney, Agent, or Firm* — Marshall, Gerstein & Borun LLP

(57) ABSTRACT

A pasteurization tunnel and a method for pasteurizing beverage packs are described, wherein the beverage packs are conveyed on at least two decks lying one upon the other and sprayed with a heated spraying liquid from spraying pipes extending each transversely to the conveying direction of the beverage packs. According to the invention, the spraying liquid is guided through the spraying pipes of the one deck into the spraying pipes of the other deck. Thereby, the maintenance efforts for removing deposits in sections of the spraying pipes where the flow is weak can be reduced.

19 Claims, 1 Drawing Sheet

PASTEURIZATION TUNNEL AND PASTEURIZATION METHOD FOR BEVERAGE PACKS

CROSS-REFERENCE TO RELATED APPLICATION

The present application claims the benefit of priority of German Application No. 10 2012 212 873.5, filed Jul. 23, 2012. The entire text of the priority application is incorporated herein by reference in its entirety.

FIELD OF THE DISCLOSURE

The disclosure relates to a pasteurization tunnel and to a method for the pasteurization of beverage packs.

BACKGROUND

Pasteurization tunnels are known to be used for pasteurizing filled products, where the filled containers, for example bottles, cans or other beverage packs, are transported on a conveyor belt through the pasteurization tunnel and simultaneously treated from above by being sprayed with a heated liquid, in particular hot water. In order to increase machine performance, it is furthermore known to arrange several similar treatment decks of the pasteurization tunnel one upon the other to divide the product stream in parallel into several partial product streams which are essentially treated equally.

In a preferred variant of known pasteurization tunnels, the products to be pasteurized are sprayed from above by means of spraying pipes arranged transversely to the direction of transport of the products. The spraying pipes are each closed at one end and are connected at the other end to a common supply conduit for the spraying liquid. The spraying pipes are thus each connected in parallel as regards the flow of spraying liquid. With such a multi-level parallel connection of the treatment decks, uniform treatment conditions over all treatment decks can be obtained.

However, one problem is that at the end of the respective spraying pipes, in the last runnings of the flow behind the nozzle that was in each case the last one to be reached by the flow, deposits accumulate which can narrow or even clog individual spraying nozzles of the spraying pipes, so that the pouring amount discharged from the respective spraying pipe cannot be kept uniform for all spraying pipes and treatment decks. Therefore, such deposits must be regularly removed through access openings at the end of the spraying pipes. A further problem here is that a plurality of such access openings must be provided which are sometimes difficult to access due to the multi-level construction of such pasteurization tunnels. Due to their construction, all treatment decks are in this respect essentially equally susceptible to trouble. The inspection of spraying during operation is correspondingly intricate.

Therefore, there is a demand for pasteurization tunnels and corresponding pasteurization methods where the fault frequency due to deposits in the spraying pipes, and thus the efforts for the inspection and cleaning of individual spraying pipes, can be reduced.

SUMMARY OF THE DISCLOSURE

One aspect of the pasteurization tunnel according to the disclosure, is at least one first and one second deck with spraying pipes extending transversely to the conveying direction of the products to be pasteurized are provided, such that the spraying pipes of the first deck are connected in series connection with the spraying pipes of the second deck to guide a spraying liquid through the first deck to the second deck.

The series connection is in particular accomplished such that last runnings of the flow in the spraying pipes of the first deck are avoided. Thus, deposits can also be avoided in the region of the first deck. Accordingly, access openings in the region of the first deck are dispensable. In other words, in the pasteurization tunnel according to the disclosure, it is sufficient to only check the last runnings of the flow in the second deck or in the last deck in the direction of flow, and to there remove possibly present deposits through an access opening. Consequently, the efforts for the inspection and cleaning of the spraying pipes of the pasteurization tunnel according to the disclosure can be clearly reduced as compared to prior art. The last runnings of the flow are defined, for example, as region behind the spraying nozzle that was the last one to be reached by the flow.

Preferably, the conduit cross-section of the spraying pipes connected in series is larger in the first deck than in the second deck. In addition to the spraying liquid discharged by the nozzles of the first deck, the spraying liquid required for the second deck can thereby also be transported through the spraying pipes of the first deck. Thus, the conduit cross-section increased in the first deck permits, despite the additional volume flow for the second deck, equivalent dynamic pressure conditions at the nozzles of the first deck and the second deck. Thereby, the pouring amounts of the spraying liquid in the first and the second decks can be matched.

In a particularly advantageous embodiment, several series connections are provided along the conveying direction, in particular in such a way that exactly one spraying pipe each of the first deck is connected with exactly one spraying pipe of the second deck. Such series connections can be particularly easily realized and are particularly reliable. In particular a direct connection in series of the individual spraying pipes without parallel branches permits reproducible volume flows through the respective spraying pipes, so that the probability of undesired deposits occurring can be particularly effectively reduced. However, it would in general also be conceivable to combine, for example, two or three spraying pipes of the first deck arranged one next to the other at the outlet side in a parallel connection, and to provide a common connection pipe to the second deck. There, the connection pipe could be in turn branched to an equal number of spraying pipes in parallel. The conduit cross-section of the connection pipe could then be selected to be correspondingly large to avoid undesired pressure losses.

In particular, spraying pipes lying each one upon the other can be connected in series. This permits a particularly simple arrangement of the conduits. An individual series connection thus preferably comprises all spraying pipes lying one upon the other of the decks provided in the pasteurization tunnel. While it is advantageous to connect all spraying pipes of the pasteurization tunnel by a series connection across the provided decks, this is not compulsory. For example, individual treatment sections along the conveyor could be connected in the described series connection, while other treatment sections along the conveyor are not connected. Depending on the treatment task, any combinations of spraying pipes connected in series and spraying pipes connected in parallel are conceivable.

In a particularly advantageous embodiment, the second deck is disposed above the first deck. Thus, a supply conduit for the spraying liquid can be provided in the region of the lower deck. Correspondingly, the inspection and cleaning of the second deck can be effected in an easily accessible upper section of the pasteurization tunnel.

Preferably, the number of nozzles per spraying pipe is higher in the respective upper deck than in the respective lower deck. Since in the respective upper deck, a lower geodetic pressure prevails than in the respective lower deck, a pouring amount per individual nozzle which is lower due to the lower geodetic pressure in the upper deck can be compensated by increasing the number of nozzles per spraying pipe compared to the respective lower deck.

Preferably, the number of nozzles per spraying pipe and/or the distances between the nozzles of individual spraying pipes are matched in order to compensate a geodetic pressure differential between the first and the second decks, in particular in such a way that the pouring amounts of spraying liquid discharged from each of the individual spraying pipes do not deviate from a mean value of the pouring amount across all spraying pipes by more than 10%, in particular more than 5%.

Thereby, for all decks and/or spraying pipes, an essentially equivalent pasteurization of the beverage packs passed through can be ensured. One could equally compensate, by the number of nozzles per spraying pipe and/or the respective nozzle distances, a difference of the static pressure between the individual decks. Since the different heights of the individual treatment decks are constant and known, the respective pouring amount of the individual decks can thus be matched in a simple manner.

A particularly advantageous embodiment furthermore comprises at least one inspection port, inspection flap or the like provided in the region of the second deck for visual spray inspection. Thereby, the treatment quality can be ensured in a simple way. Inspection cameras in the region of the second deck would also be conceivable. A visual inspection of the spraying in the region of the first deck, however, can be eliminated.

Preferably, the spraying pipes of the second deck comprise an access opening accessible from outside at their rear ends in the direction of flow, in particular in the last runnings of the flow behind the respective last nozzle that is reached by the flow. The access opening is closed during the operation of the pasteurization tunnel. For this, a suited lid is provided which can include, for example, a viewing glass. The last runnings of the flow is in particular meant to be a region in which the flow energy is lower than in the regions of the nozzles and the regions between the nozzles. The access opening is meant to be an opening permitting sufficient access to the respective spraying pipe for the purpose of maintaining and/or cleaning it.

A particularly advantageous embodiment furthermore comprises at least one further deck which is situated between the first and the second decks and whose spraying pipes are inserted in series. Thus, for the further decks, the same advantages as were described for the first deck could also be achieved. This means that due to the series connection, an inspection and/or cleaning of the spraying pipes of the further decks is also dispensable. Correspondingly, even in an embodiment of the pasteurization tunnel according to the disclosure having at least three levels, an inspection and/or cleaning of the spraying pipes each provided at the end of the series connection is sufficient. Here, the individual decks can be realized by essentially identical tunnel modules which are stacked one upon the other and only differ from each other by the conduit properties described with respect to the first and second decks. In particular, in multi-level pasteurization tunnels, too, the conduit cross-sections can be matched stepwise from deck to deck. This is also true for the described adaptation of the number of spraying nozzles per spraying pipe and/or the nozzle distances of individual spraying pipes. With such multi-level pasteurization tunnels, the machine performance can be further increased with a treatment quality that is the same for all decks.

The set aspect of the disclosure noted above is furthermore achieved with a pasteurization method, where the beverage packs are conveyed on at least two treatment decks situated one upon the other and sprayed with a heated spraying liquid from spraying pipes each extending transversely to the conveying direction of the beverage packs. According to the disclosure, the spraying liquid is guided through the spraying pipes of the one treatment deck into the spraying pipes of the other treatment deck.

With the method according to the disclosure, any packs, for example bottles, canisters, cans, or the like, with a product to be pasteurized, such as a beverage, another item of food or the like, can be treated by heat. The method according to the disclosure in particular permits a treatment quality that is equivalent for all decks by providing similar pouring amounts in the individual decks. By the spraying liquid being guided through at least one treatment deck, deposits in the spraying pipes of these treatment decks can be reliably avoided. Thereby, the efforts for the inspection and cleaning of these decks are reduced.

Preferably, the mean control speed in the spraying pipes is not higher than 5 m/s, in particular not higher than 4 m/s, thereby the dynamic pressure can be provided in the region of the nozzles for the desired spraying.

Preferably, the mean flow rate in the spraying pipes between the decks differs by no more than 20%, in particular no more than 10%. This means that the method according to the disclosure permits in all decks equally suited dynamic pressures in the spraying pipes to ensure uniform spraying in all decks.

In a particularly advantageous variant of the method according to the disclosure, the cross-sections of the spraying pipes are furthermore adapted to match the respective dynamic pressures of the spraying liquid at the nozzles of different decks. In other words, the volume flows in the individual sections of the series connection are adapted such that both a supply of the respective downstream spraying pipes and an essentially uniform mean volume flow are ensured. Thereby, the spraying quality of the individual decks can be particularly easily matched.

Preferably, furthermore the number of nozzles each provided per spraying pipe and/or the distances between nozzles of individual spraying pipes are matched between different decks to compensate differences between static and/or geodetic pressures of the spraying liquid in the spraying pipes of the different decks. Thereby, the respective pouring amount of the individual decks can be additionally matched.

Preferably, the beverage packs pass through the decks as parallel partial product streams. Thus, the beverage packs are preferably treated equally in all decks. Correspondingly, the method according to the disclosure is suited for the high production performances required in the field of filling lines.

BRIEF DESCRIPTION OF THE DRAWINGS

A preferred embodiment of the disclosure is represented in the drawing. In the drawing.

DETAILED DESCRIPTION OF THE PREFERRED EMBODIMENTS

Figure 1:
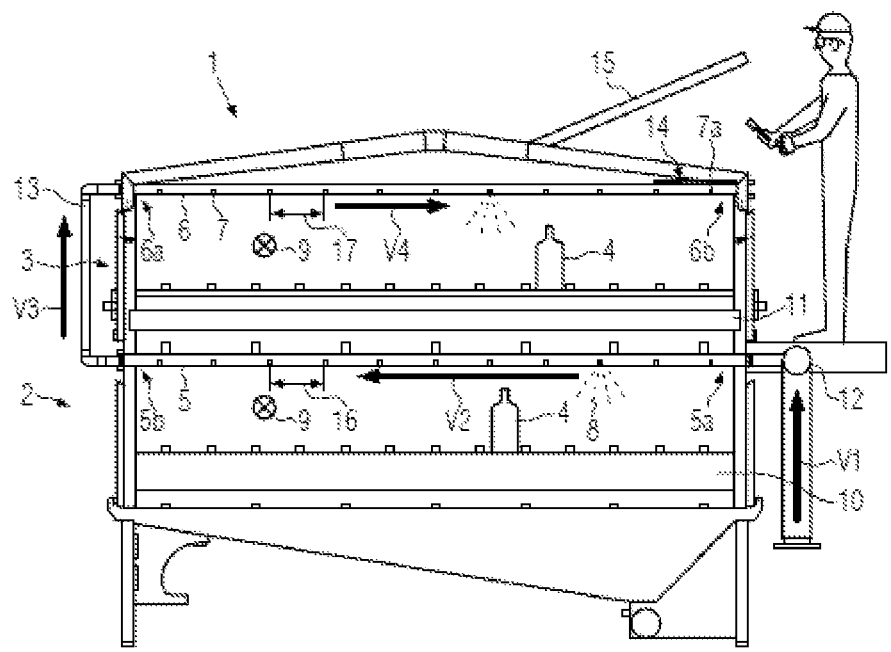
FIG. 1 shows a cross-section through a two-level pasteurization tunnel.

As can be seen in FIG. 1, a two-level embodiment of the inventive pasteurization tunnel 1 comprises a first, lower deck 2 and an upper, second deck 3, each for equally spraying beverage packs 4 from spraying pipes 5, 6, associated with the decks 2, 3. The spraying pipes each comprise nozzles 7 from which a spraying liquid 8, for example heated water, is discharged to the beverage packs 4 passing underneath the spraying pipes 5, 6 in a conveying direction 9. As can be furthermore seen in FIG. 1, the spraying pipes 5, 6 are provided transversely to the conveying direction 9 of the beverage packs 4. The beverage packs 4 are standing on conveyors 10, 11 driven in the same direction during pasteurization. These can be designed as conveyor belts of known construction and are therefore not illustrated in greater detail.

Figure 2:
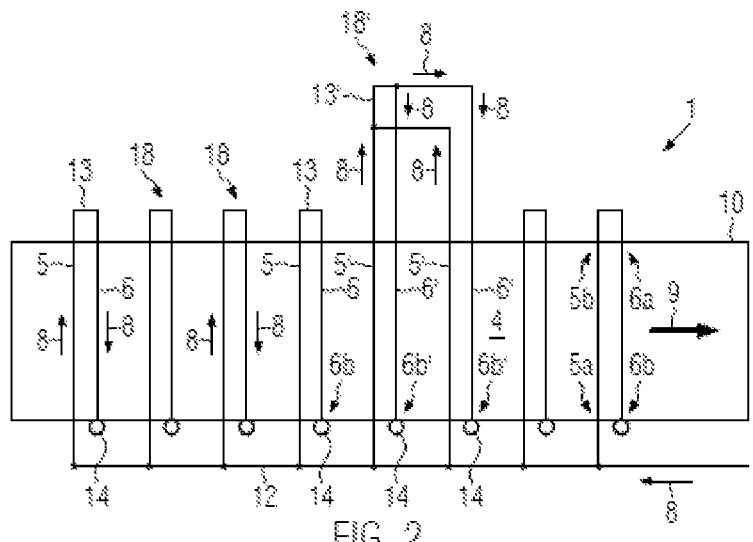
FIG. 2 shows a schematic plan view onto the pasteurization tunnel of FIG. 1.

In the pasteurization tunnel 1 according to the disclosure, several spraying pipes 5, 6 extending transversely are each provided in the decks 2, 3 one behind the other in the conveying direction 9. The spraying pipes 5, 6, can be oriented essentially in parallel in a well-known manner. This is schematically indicated in FIG. 2. In contrast to well-known devices, however, only the spraying pipes 5 of the first deck 2 branch off in parallel from a supply conduit 12. The latter correspondingly extends into and out of the plane of projection in FIG. 1.

In FIG. 1, volume flows V1 to V4 of the spraying liquid 8 are schematically indicated for illustrating a series connection through the decks 2, 3 realized in the pasteurization tunnel 1 according to the disclosure. Accordingly, the volume flow V1 designates the volume flow of the spraying liquid 8 altogether supplied to the pasteurization tunnel 1 via the supply conduit 12. From the supply conduit 12, the spraying pipes 5 of the first, lower deck 2 branch off in parallel. Thus, the volume flow V1 is distributed to the respective partial volume flows V2 through the individual spraying pipes 5 of the first deck 2. The partial volume flows V2 each serve the supply of the nozzles 7 of the respective spraying pipe 5 and the supply of subsequent spraying pipes, in the example of a supply of the nozzles 7 of the spraying pipe 6 of the second, upper deck 3 respectively arranged above. V2 here designates the mean volume flow through the spraying pipes 5 of the first deck 2.

As can be seen in FIG. 1, the spraying pipes 5 of the first deck 2 are connected with the spraying pipes 6 of the second deck 3 by means of one connection conduit 13 each in series connection. In the connection conduit 13, a volume flow V3 is flowing which corresponds to the amount of spraying liquid 8 to be discharged by the nozzles 7 of the spraying pipe 6. In the upper spraying pipe 6, there is a mean volume flow V4.

To illustrate the functioning of the pasteurization tunnel 1 according to the disclosure, an inlet section 5a and an outlet section 5b of the first spraying pipe 5, and an inlet section 6a and an end section 6b of the second spraying pipe 6 are schematically indicated. The outlet section 5b of the first spraying pipe 5 is preferably, but not compulsorily, connected directly and without parallel branch with the inlet region 6a of the second spraying pipe 6. In this case, the volume flow of the spraying liquid 8 in the outlet section 5b of the first spraying pipe 5 and in the inlet section 6a of the second spraying pipe 6 is identical and corresponds to the volume flow V3 through the connection conduit 13.

The volume flow through the inlet section 5a of the first spraying pipe 5 differs from the volume flow through the outlet section 5b of the first spraying pipe 5 by the volume flow of the spraying liquid 8 altogether exiting from the nozzles 7 of the first spraying pipe 5.

The series connection of the first and second spraying pipes 5, 6 according to the disclosure has the effect that the flow both through the inlet sections 5a, 6a and the outlet section 5b of the first spraying pipe 5 is so strong that deposits in them and between these sections are avoided. Moreover, deposits in the region of the nozzles 7 of the second spraying pipe 6 can be normally reliably avoided. Only in the end section 6b of the second spraying pipe 6, the volume flow through the second spraying pipe 6 decreases to such an extent that deposits cannot be reliably avoided. The latter can in particular be formed in the last runnings of the flow between the last nozzle 7a that is reached by the flow and the closed end of the second spraying pipe 6 (in FIG. 1 indicated by the end region 6b). In the pasteurization tunnel 1 according to the disclosure, thus only the end section 6b of the second spraying pipe 6 and/or the respective adjacent nozzle(s) 7 must be inspected and cleaned, if required.

In FIG. 1, the region of an access opening 14 with a removable lid each provided in the second spraying pipe 6 is indicated. The access opening 14 is preferably arranged such that it is easily accessible by operators from outside, for example through a flap 15 in the roof region of the pasteurization tunnel 1.

The conduit cross-section of the first spraying pipes 5 is preferably larger than the conduit cross-section of the second spraying pipes 6 (not represented). The cross-sections of the first and second spraying pipes 5, 6 are then matched in such a way that in both spraying pipes 5, 6 essentially the same mean volume flow prevails. This ensures that at the nozzles 7 of both decks 2, 3 essentially the same dynamic pressure of the spraying liquid 8 prevails. Correspondingly, the nozzles 7 of both decks 2, 3 can discharge the same pouring amounts of the spraying liquid 8. Here, the nozzles 7 of both decks 2, 3 can have identical designs.

Additionally, the distances 16 between the nozzles 7 of the first spraying pipe 5 can differ from the distances 17 between the nozzles 7 of the second spraying pipe 6 (not shown). For example, the distances 16, 17 can differ in such a way that in the second spraying pipe 6, one more nozzle 7 is provided than in the first spraying pipe 5. Thereby, one could compensate, for example, a geodetic pressure differential between the spraying pipes 5, 6 of the first and the second decks 2, 3. For example, due to the higher number of nozzles 7 in the second spraying pipes 6, the same pouring amount of the spraying liquid 8 could be discharged as with the lower, first spraying pipes 5 despite an altogether lower geodetic pressure.

The spraying pipes 5, 6 preferably have a round cross-section. However, in principle polygonal, in particular rectangular, cross-sections would also be conceivable. For the spraying pipes 5 of the first deck 2, for example, conduit cross-sections of a diameter of 55 to 65 mm would be suited, for the spraying pipes 6 of the second deck 3, conduit cross-sections of a diameter of 43 to 53 mm would be suited. Preferably, the mean volume flow in the spraying pipes 5, 6 is not higher than 4 m/s, in particular not higher than 3 m/s.

The two-level embodiment of the pasteurization tunnel 1 according to the disclosure indicated in FIG. 1 could be supplemented by further decks (not represented) which to this end would have to arranged between the first, lower deck 2 and the second, upper deck 3. The corresponding spraying pipes would have to be connected in series by means of further connection pipes 13 between the spraying pipes 5, 6 of the first and second decks 2, 3. Correspondingly, the conduit cross-sections of the respective spraying pipes, seen in the direction of flow, would preferably have to be designed with cross-sections diminishing from deck to deck. Equally, the distances between the nozzles 7 could be, following the described example, matched between the decks 2, 3 and the further provided decks for compensating geodetic and/or static pressure differentials.

The direction of flow indicated in FIG. 1, for example, with the volume flow V3 with respect to the decks 2, 3 from the bottom to the top is particularly advantageous in view of a simple inspection and cleaning of the pasteurization tunnel 1. As is indicated, the pasteurization tunnel 1 according to the disclosure can then be easily checked in the roof region of the pasteurization tunnel 1. For example, the correct spraying function of the spraying pipes 6 arranged at the end of the series connection can thus be checked. Equally, the access openings 14 could be easily opened if required, and deposits in the end sections 6b of the second spraying pipes 6 could be removed, if required. In general, however, a direction of flow from the top to the bottom with respect to the decks 2, 3 is also conceivable for the correct function of the pasteurization tunnel 1 according to the disclosure.

Equally, a series connection of spraying pipes in groups would be in principle conceivable, as it is indicated only by way of example in FIG. 2 for first spraying pipes 5' combined in parallel at the outlet side which are connected via a common connection conduit 13' to two second spraying pipes 6' combined in parallel at the inlet side. With such series connections in groups, too, the one aspect according to the disclosure can be achieved such that the inspection of the spraying and an optionally necessary cleaning can be essentially restricted to the end sections 6b' of the second spraying pipes 6'. The conduit cross-section of the common connection conduit 13' then would have to be designed correspondingly to be able to provide the required volume flows V2, V4 also in the combined spraying pipes 5', 6'.

For a better overview, only the lower conveyor 10 is schematically indicated in FIG. 2, and it is moreover schematically illustrated that according to the disclosure, several individual series connections 18 with spraying pipes 5, 6 connected to each other without branches, and/or combined series connections 18' with connection conduits 13' between spraying pipes 5', 6' of different decks combined in parallel can be provided.

One can work as follows with the pasteurization tunnel 1 according to the disclosure:

A continuous flow of beverage packs 4 or the like to be pasteurized is distributed in a (non-depicted) inlet area of the pasteurization tunnel 1 to the two decks 2, 3, so that the beverage packs 4 can be sprayed with the heated spraying liquid 8 in the respective decks 2, 3 preferably in the same manner. The individual decks 2, 3 are therefore preferably built as equal modules which only differ in view of the arrangement of conduits for the spraying liquid 8. A predetermined volume flow V1 of the spraying liquid 8 is here preferably uniformly distributed to all first spraying pipes 5 provided in the pasteurization tunnel 1. The spraying liquid 8 is distributed by the first spraying pipes 5 partially corresponding to a predetermined pouring amount over the beverage packs 4 to be pasteurized, and partially guided further through the first spraying pipes 5 towards the second spraying pipes 6. There, the spraying liquid 8 is preferably distributed over the beverage packs 4 in such a way that the latter are sprayed by the same pouring amount as in the first deck 2. Thereby, a uniform product quality can be ensured even when the product stream is divided in parallel to the individual decks 2, 3.

If required, or corresponding to predetermined maintenance intervals, the end regions 6b of the second spraying pipes 6 can be checked, for example, by opening flaps 15 in the roof region of the pasteurization tunnel 1. If a reduced spraying quality is detected, deposits present in the second spraying pipes 6 can be removed through the access openings 14. Thus, a required product quality can be ensured by clearly less efforts for maintenance compared to prior art. Moreover, downtimes for the inspection and cleaning of the pasteurization tunnel 1 according to the disclosure can be reduced compared to prior art. Moreover, the maintenance of the pasteurization tunnel 1 according to the disclosure can be improved in view of safety at work and the accessibility of plant parts to be inspected at regular intervals.

The invention claimed is:

1. A pasteurization tunnel for pasteurizing beverage packs, comprising at least one first and one second deck which are situated one upon the other and each comprise a conveyor for the beverage packs and a plurality of spraying pipes with nozzles for spraying the beverage packs, the spraying pipes extending transversely to the conveying direction of the conveyors, and the spraying pipes of the first deck being fluidically connected in series with the spraying pipes of the second deck to guide a spraying liquid through the first deck to the second deck, where an outlet section of at least one spraying pipe of the first deck is directly connected to an inlet section of at least one spraying pipe of the second deck, and wherein the spraying pipes of the first deck are connected with the spraying pipes of the second deck by means of one connection conduit each in series connection, a volume flow of the spraying liquid in the outlet section of the first spraying pipe and in the inlet section of the serially connected second spraying pipe being identical and corresponding to the volume flow through the connection conduit in between the first deck and the second deck.

2. The pasteurization tunnel according to claim 1, wherein a conduit cross-section of the spraying pipes connected in series is larger in the first deck than in the second deck.

3. The pasteurization tunnel according to claim 1, wherein several series connections between the spraying pipes of the first and second decks are provided along the conveying direction.

4. The pasteurization tunnel according to claim 1, wherein the second deck is situated above the first deck.

5. The pasteurization tunnel according to claim 1, wherein the number of nozzles per spraying pipe is higher in the respective upper deck than in the respective lower deck.

6. The pasteurization tunnel according to claim 1, wherein at least one of a number of nozzles per spraying pipe provided in the first deck differs from a number of nozzles per spraying pipe provided in the second deck, or distances between the nozzles of the first and the second decks differ from each other to compensate for a geodetic pressure differential between the first and the second decks.

7. The pasteurization tunnel according to claim 1, and at least one inspection port provided in the region of the second deck for visual spray inspection.

8. The pasteurization tunnel according to claim 1, wherein the spraying pipes of the second deck comprise, at their rear end seen in the direction of flow, an access opening accessible from outside, provided in a roof region of the pasteurization tunnel and closed during operation of the pasteurization tunnel.

9. The pasteurization tunnel according to claim 1, and at least one further deck situated between the first and the second decks whose spraying pipes are inserted in series.

10. The pasteurization tunnel according to claim 1, wherein the mean flow rate in the spraying pipes is not higher than 5 m/s.

11. The pasteurization tunnel according to claim 1, wherein the mean flow rate in the spraying pipes between the at least one first deck and the at least one second deck does not differ from each other by more than 20%.

12. The pasteurization tunnel according to claim 1, wherein the cross-sections of the spraying pipes are adapted to match the respective dynamic pressures caused by the spraying liquid at the nozzles of the at least one first deck and the at least one second deck.

13. The pasteurization tunnel according to claim 3, and wherein exactly one spraying pipe each of the first deck is connected with exactly one spraying pipe of the second deck.

14. The pasteurization tunnel according to claim 6, and wherein the pouring amount of the spraying liquid each discharged from the individual spraying pipes does not deviate from a mean value of the pouring amount across all spraying pipes by more than 10%.

15. The pasteurization tunnel according to claim 6, and wherein the pouring amount of the spraying liquid each discharged from the individual spraying pipes does not deviate from a mean value of the pouring amount across all spraying pipes by more than 5%.

16. The pasteurization tunnel according to claim 8, wherein the access opening is downstream of the last nozzle to be reached by the flow in the last runnings of the flow.

17. The pasteurization tunnel according to claim 10, wherein the mean flow rate is not higher than 4 m/s.

18. The pasteurization tunnel according to claim 11, wherein the mean flow rate in the spraying pipes between the at least one first deck and the at least one second deck does not differ from each other by more than 10%.

19. A pasteurization tunnel for pasteurizing beverage packs, comprising at least one first deck and one second deck which are situated one upon the other and each comprise a conveyor for the beverage packs and a plurality of spraying pipes with nozzles for spraying the beverage packs, the spraying pipes extending transversely to the conveying direction of the conveyors, and the spraying pipes of the first deck being fluidically connected in series with the spraying pipes of the second deck to guide a spraying liquid through the first deck to the second deck, where an outlet section of at least one spraying pipe of the first deck is directly connected to an inlet section of at least one spraying pipe of the second deck, groups of two or three spraying pipes of the first deck, that are arranged one next to the other at the outlet side in a parallel connection, being connected by means of one common connection conduit each to the second deck where the connection conduit branches to an equal number of spraying pipes in parallel for each group.

* * * * *